United States Patent [19]

Hong et al.

[11] Patent Number: 5,479,420
[45] Date of Patent: Dec. 26, 1995

[54] CLOCK FAULT MONITORING CIRCUIT

[75] Inventors: Jae H. Hong; Dong J. Shin; Youn K. Jeong; Hyeong J. Park, all of Daejeon, Rep. of Korea

[73] Assignees: Electronics and Telecommunications Research Institute, Daejon; Korea Telecommunication Authority, Seoul, both of Rep. of Korea

[21] Appl. No.: 173,177

[22] Filed: Dec. 28, 1993

[30] Foreign Application Priority Data

Dec. 29, 1992 [KR] Rep. of Korea ............... 1992-26109

[51] Int. Cl.$^6$ .................................................. G11B 27/00
[52] U.S. Cl. ....................... 371/61; 364/270; 364/DIG. 1
[58] Field of Search .............................. 371/61, 62, 57.1; 364/270; 395/575

[56] References Cited

U.S. PATENT DOCUMENTS

| | | | |
|---|---|---|---|
| 4,586,180 | 4/1980 | Anders et al. | 371/62 |
| 4,800,564 | 1/1989 | DeFazio et al. | 371/15.1 |
| 4,803,708 | 2/1989 | Momose | 371/61 |
| 4,912,708 | 3/1990 | Wendt | 371/16.3 |
| 5,065,313 | 11/1991 | Lunsford | 395/275 |
| 5,113,504 | 5/1992 | Matsuda | 395/575 |
| 5,313,476 | 5/1994 | Haberkorn, Jr. et al. | 371/61 |
| 5,345,583 | 9/1994 | Davis | 395/575 |

FOREIGN PATENT DOCUMENTS

| | | | |
|---|---|---|---|
| 206318 | 9/1986 | Japan | H03K 23/766 |
| 267833 | 11/1991 | Japan | H04L 7/00 |

Primary Examiner—Robert W. Beausoliel, Jr.
Assistant Examiner—Albert Decady
Attorney, Agent, or Firm—Spencer, Frank & Schneider

[57] ABSTRACT

A circuit for determining whether a digital circuit clock is operating normally. It includes a monitoring clock receiver for receiving a monitoring clock signal, a counter reset generator which generates a first reset signal in response to the monitoring clock signal, and a reset signal receiver for receiving a second reset signal and synchronizing the second reset signal with the monitoring clock signal. The second reset signal is also used to initialize a digital circuit pack upon power-on. The circuit further includes a monitoring counter circuit for sampling and counting a reference clock signal in response to the first and second reset signals to monitor the monitoring clock signal. The reference clock signal has a frequency twice that of the monitoring clock signal. A NAND logic unit is provided for outputting the monitored result in response to an output signal from the monitoring counter circuit so that the user can determine a clock error according to the monitored result. An output hold circuit is further provided for holding the monitored result from the NAND logic unit when the monitoring clock signal is abnormal.

6 Claims, 3 Drawing Sheets

CLOCK FAULT MONITORING CIRCUIT

BACKGROUND OF THE INVENTION

1. Field of the Invention

The present invention relates in general to a clock fault monitoring circuit using a flip-flop and a counter, and more particularly to a circuit for monitoring, using the flip-flop and the counter, whether a clock in a digital circuit pack or a transmission clock for data communication is operating normally.

2. Description of the Prior Art

Recently, the reliability of a digital transmission device and data transmission thereof has been increased according to an increase in the reliability of a clock used in an electronic device circuit pack or a digital communication system.

Conventionally, a clock fault monitoring circuit is provided with a 74LS123 TTL device to monitor a fault of the clock used in the electronic device circuit pack or the digital communication system. However, the conventional clock fault monitoring circuit has a disadvantage in that timing is not accurate since the clock fault monitoring is performed on the basis of a time constant resulting from the combination of a resistance and a capacitance. Also, the resistance and the capacitance are not standardized but obtained by repeated experimentation. Further, the device density of the circuit pack is high at present. For this reason, the resistance and the capacitance are subject to severe variations due to an increase in the heat generated in the circuit pack. This makes it impossible to monitor the clock fault accurately.

SUMMARY OF THE INVENTION

Therefore, the present invention has been made in view of the above problems, and it is an object of the present invention to provide a clock fault monitoring circuit which is capable of monitoring error generation of a clock using a general TTL device within an operating allowable frequency range of the device and according to an allowable clock error defined by the user.

In accordance with the present invention, the above and other objects can be accomplished by provision of a clock fault monitoring circuit comprising monitoring clock reception means for receiving a clock for monitoring; counter reset generation means for generating a first reset signal in response to the monitoring clock received by said monitoring clock reception means; reset signal reception means for receiving a second reset signal and synchronizing the received second reset signal with the monitoring clock or a reference clock, said second reset signal being used to initialize a digital circuit pack upon power-on; monitoring counter means for sampling and counting the reference clock in response to the first and second reset signals from said counter reset generation means and reset signal reception means respectively to monitor the monitoring clock, said reference clock having a frequency twice that of the monitoring clock; NAND logic means for outputting the monitored result in response to an output signal from said monitoring counter means so that the user can determine a clock error according to the monitored result; and output hold means for holding the monitored result from said NAND logic means when the monitoring clock is abnormal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
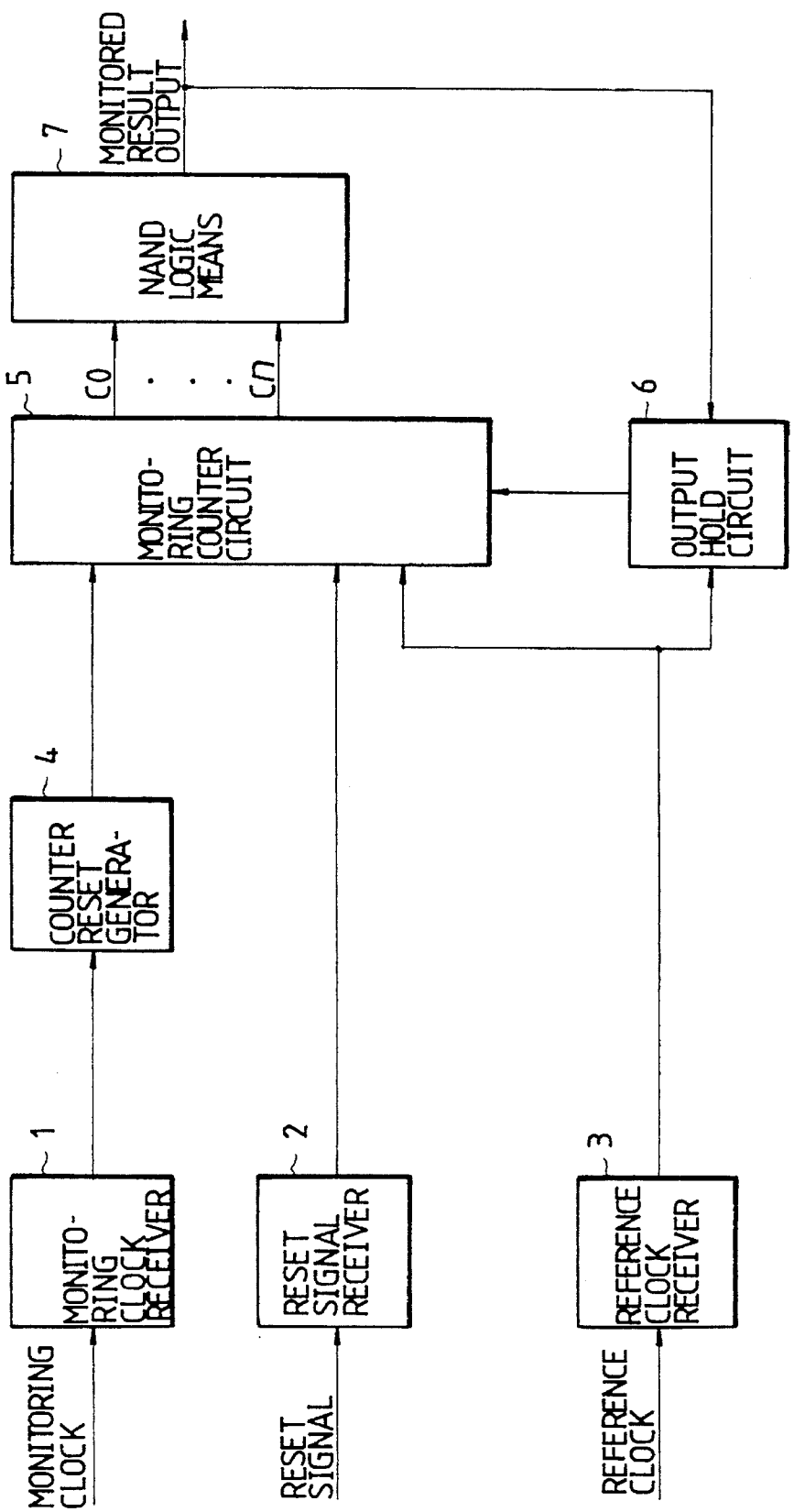
FIG. 1 is a block diagram of a clock fault monitoring circuit in accordance with the present invention.
Figure 2:
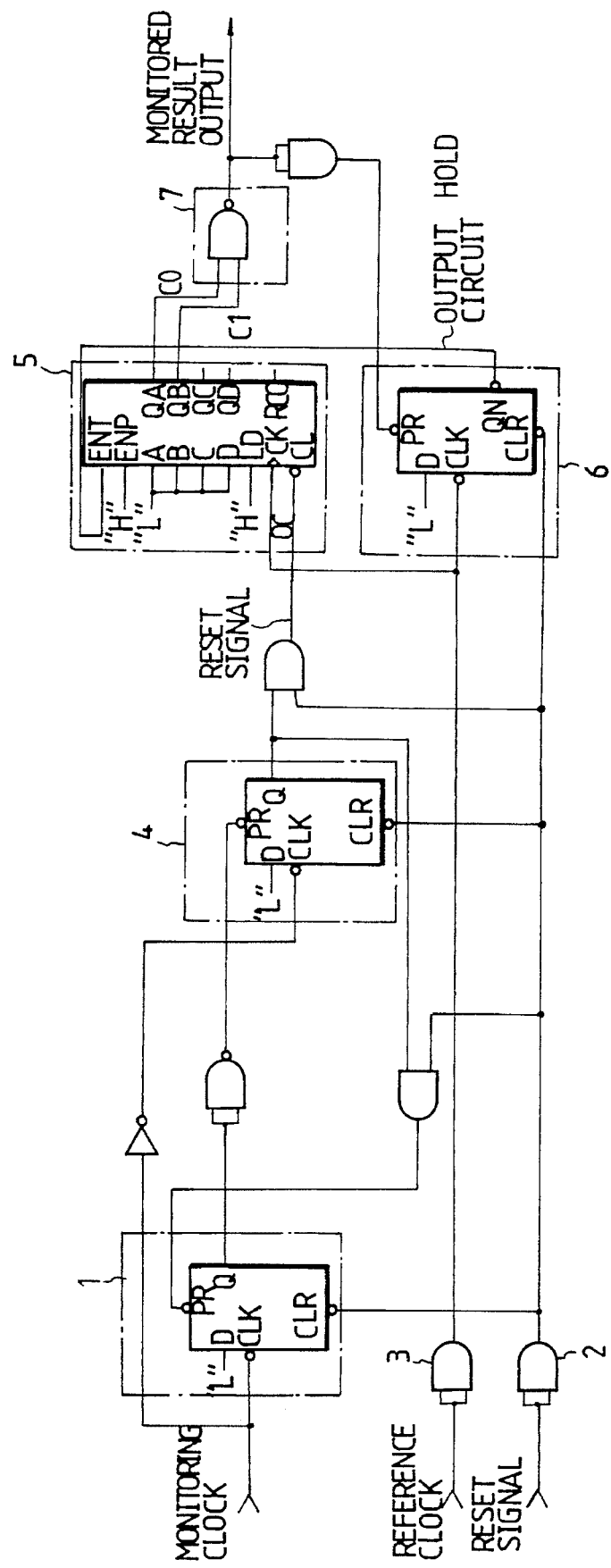
FIG. 2 is a detailed circuit diagram of the clock fault monitoring circuit in accordance with an embodiment of the present invention.

FIG. 1 is a block diagram of a clock fault monitoring circuit in accordance with the present invention and FIG. 2 is a detailed circuit diagram of the clock fault monitoring circuit in accordance with an embodiment of the present invention. As shown in these drawings, the clock fault monitoring circuit comprises a monitoring clock receiver 1 for receiving a clock for monitoring, and a counter reset generator 4 for generating a first reset signal in response to the monitoring clock received by the monitoring clock receiver 1, The monitoring clock receiver 1 includes a flip-flop for inputting the monitoring clock at its clock input terminal. An output terminal of the flip-flop is connected to a preset terminal of a flip-flop of the counter reset generator 4 to control the preset terminal. Under the control of the monitoring clock receiver 1, the counter reset generator 4 can generate the first reset signal at a first negative edge trigger of the monitoring clock when the monitoring clock is normal. On the other hand, when the monitoring clock is abnormal, no first reset signal is generated from the counter reset generator 4.

A reset signal receiver 2 is provided in the clock fault monitoring circuit to receive a second reset signal and synchronize the received second reset signal with the monitoring clock or a reference clock. The second reset signal is used to initialize a digital circuit pack upon power-on. Also, the second reset signal may be used to initialize the flip-flop of the counter reset generator 4 in accordance with the preferred embodiment of the present invention. The reset signal receiver 2 may be a buffer in accordance with the preferred embodiment of the present invention.

A reference clock receiver 3 is also provided in the clock fault monitoring circuit to receive the reference clock. The reference clock has a frequency twice that of the monitoring clock. The reference clock receiver 3 may be a buffer for stabilization in accordance with the preferred embodiment of the present invention.

A monitoring counter circuit 5 is also provided in the clock fault monitoring circuit to sample and count the reference clock received by the reference clock receiver 3 in response to the reset signals from the counter reset generator 4 and reset signal receiver 2 to monitor the monitoring clock. As mentioned above, the reference clock has a frequency twice that of the monitoring clock. The monitoring speed of the monitoring counter circuit 5 is adjustable by the user according to the frequency of the reference clock. In the case where the monitoring clock is normal, the counter reset generator 4 generates the first reset signal every clock, thereby causing an error counting of the monitoring counter circuit 5 to be reset. As a result, the monitored result is normally outputted.

NAND logic means 7 is also provided in the clock fault monitoring circuit to output the monitored result in response to an output signal from the monitoring counter circuit 5 so that the user can determine a clock error according to the monitored result.

An output hold circuit 6 is also provided in the clock fault monitoring circuit to hold the monitored result from the NAND logic means 7 when the monitoring clock is abnormal. The output hold circuit 6 includes a flip-flop having a preset terminal connected to an output of the NAND logic means 7. When the monitoring clock is abnormal, the output hold circuit 6 outputs an output hold signal to the monitoring counter circuit 5 in response to an output signal from the NAND logic means 7, so as to stop the operation of the monitoring counter circuit 5. As a result, the output signal from the monitoring counter circuit 5 and, thus, the monitored result from the NAND logic means 7 are held at the present state. Then, when the monitoring clock is normal, the monitoring counter circuit 5 is reset in response to the first reset signal from the counter reset generator 4. Namely, the operation of the monitoring counter circuit 5 is normally performed.

The monitored result is obtained by a combination of the counted value (CO—Cn) from the monitoring counter circuit 5 by the NAND logic means 7.

Figure 3:
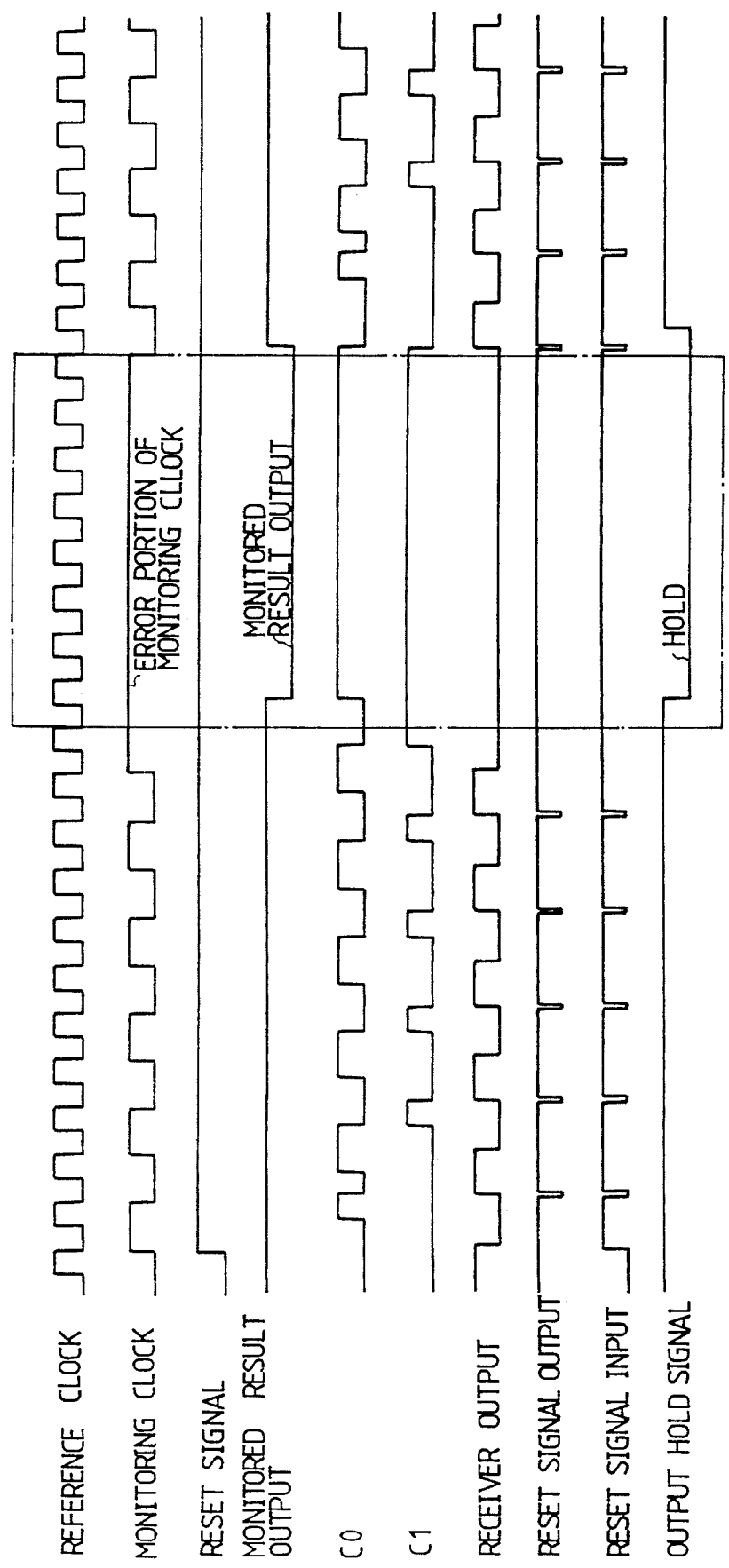
FIG. 3 is a timing diagram showing signals in the clock fault monitoring circuit in accordance with the embodiment of the present invention.

The operation of the clock fault monitoring circuit with the above-mention construction in accordance with the embodiment of the present invention will hereinafter be described in detail with reference to FIG. 3, which is a timing diagram of the signals in the clock fault monitoring circuit in accordance with the embodiment of the present invention.

First, the flip-flop of the monitoring clock receiver 1 is initialized. Then, upon receiving a first positive edge trigger of the monitoring clock, a preset characteristic of the flip-flop of the monitoring clock receiver 1 is used depending on the frequency of the monitoring clock. Namely, in the case where the data is logically "L" and the preset terminal is logically "H", a value of the input data is outputted from the flip-flop. When the preset terminal is "L" regardless of the input data value, the output data from the flip-flop remains at its logical level "H" until the subsequent positive edge trigger of the monitoring clock is applied.

In this connection, the preset terminal of the flip-flop of the monitoring clock receiver 1 is controlled in response to the output signal from the counter reset generator 4 so that the output data from the flip-flop of the monitoring clock receiver 1 can remain at its "H" level from the negative edge trigger of the monitoring clock to the subsequent positive edge trigger thereof. The output signal from the flip-flop of the monitoring clock receiver 1 is an inversion of the monitoring clock, and is used to control the preset terminal of the flip-flop of the counter reset generator 4.

Subsequently, the counter reset signal is generated from the counter reset clock generator 4 on every negative edge trigger of the monitoring clock. As a result, when the monitoring clock is normal, the counting operation of the monitoring counter circuit 5 is again performed from the beginning in response to the reset signal from the counter reset generator 4 before its counted value reaches an error value determined by the user.

On the other hand, in the case where the monitoring clock is abnormal, the counted value from the monitoring counter circuit 5 reaches the error value determined by the user and the monitored result from the NAND logic means 7 then becomes logical "b". Then, the output signal from the NAND logic means 7 is applied to the preset terminal of the flip-flop of the output hold circuit 6. In response to the output signal from the NAND logic means 7, the output hold circuit 6 outputs the output hold signal to the monitoring counter circuit 5 to stop the counting operation of the monitoring counter circuit 5. As a result, the output signal from the monitoring counter circuit 5 and, thus, the monitored result from the NAND logic means 7 are held at the present state until the monitoring clock becomes normal.

As apparent from the above description, according to the present invention, the fault of the clock used in the electronic device circuit pack or the digital communication system is accurately monitored by the clock fault monitoring circuit. Therefore, it is possible to minimize an effect resulting from a malfunction of the clock.

What is claimed is:

1. A clock fault monitoring circuit comprising:

monitoring clock reception means for receiving a clock for monitoring;

counter reset generation means for generating a first reset signal in response to the monitoring clock received by said monitoring clock reception means;

reset signal reception means for receiving a second reset signal and synchronizing the received second reset signal with the monitoring clock or a reference clock, said second reset signal initializing a digital circuit pack upon power-on;

monitoring counter means for sampling and counting the reference clock in response to the first and second reset signals from said counter reset generation means and reset signal reception means respectively to monitor the monitoring clock, said reference clock having a frequency twice that of the monitoring clock;

NAND logic means for outputting the monitored result in response to an output signal from said monitoring counter means, a clock error being determined according to the monitored result; and output hold means for holding the monitored result from said NAND logic means when the monitoring clock is abnormal.

2. A clock fault monitoring circuit as set forth in claim 1, further comprising:

reference clock reception means for receiving said reference clock and applying the received reference clock to said monitoring counter means and said output hold means.

3. A clock fault monitoring circuit as set forth in claim 2, wherein said monitoring clock reception means has a preset terminal, said preset terminal being controlled every half a period of an output signal from said counter reset generation means.

4. A clock fault monitoring circuit as set forth in claim 2, wherein said monitoring counter means has an at least 2-bit counter, said counter being controlled to hold the monitored result from said NAND logic means until the monitoring clock becomes normal.

5. A clock fault monitoring circuit as set forth in claim 1 wherein said monitoring clock reception means comprises a first flip-flop and said counter reset generation means comprises a second flip-flop, each of said first and second flip-flops having an input terminal, an output terminal and a preset terminal, said monitoring clock being received at the input terminal of said flip-flop;

first inverting means connecting the monitoring clock to the input terminal of said second flip-flop, and second inverting means connecting the output terminal of said first flip-flop to the preset terminal of said second flip-flop; and an AND gate coupling said first and second reset signals to the preset terminal of said first flip-flop.

6. A clock fault monitoring circuit as set forth in claim 5 wherein said second reset signal is coupled to said second flip-flop, said second reset signal initializing said second flip-flop.

* * * * *